United States Patent [19]

Hinai

[11] 4,424,564
[45] Jan. 3, 1984

[54] DATA PROCESSING SYSTEM PROVIDING DUAL STORAGE OF REFERENCE BITS

[75] Inventor: Mamoru Hinai, Hadano, Japan

[73] Assignee: Hitachi, Ltd., Tokyo, Japan

[21] Appl. No.: 268,352

[22] Filed: May 29, 1981

[30] Foreign Application Priority Data

Jun. 2, 1980 [JP] Japan .................. 55-73957

[51] Int. Cl.³ .......................................... G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,577,185 | 5/1971 | Belady ................................ | 364/200 |
| 3,839,706 | 10/1974 | Borchsenius ...................... | 364/200 |
| 4,169,284 | 9/1979 | Hogan et al. ..................... | 364/200 |
| 4,173,783 | 11/1979 | Couleur et al. ................... | 364/200 |
| 4,197,580 | 4/1980 | Chang et al. ..................... | 364/200 |
| 4,229,789 | 10/1980 | Morgan et al. .................... | 364/200 |
| 4,257,097 | 3/1981 | Moran ................................ | 364/200 |
| 4,277,826 | 7/1981 | Collins et al. ..................... | 364/200 |
| 4,277,836 | 7/1981 | Kawakami ......................... | 364/900 |
| 4,290,103 | 9/1981 | Hattori .............................. | 364/200 |
| 4,290,104 | 9/1981 | Holtey et al. ..................... | 364/200 |
| 4,322,795 | 3/1982 | Lange et al. ...................... | 364/200 |
| 4,326,248 | 4/1982 | Hinai et al. ....................... | 364/200 |
| 4,345,309 | 8/1982 | Arulpragasan et al. ............ | 364/200 |

OTHER PUBLICATIONS

*IBM System 1370 Principles of Operation*, GA 22-70-00-3, 4th Ed., Jan. 1973, p. 33.

*Primary Examiner*—Jerry Smith
*Assistant Examiner*—Gary V. Harkcom
*Attorney, Agent, or Firm*—Antonelli, Terry & Wands

[57] ABSTRACT

In a data processing system having a buffer storage and operated in a virtual storage system, storage keys including reference bits are retained in a storage key memory one for each predetermined unit of real storage, and reference bits are retained in a reference bit memory one for each predetermined unit of the real storage. Whenever the real storage is referred, the corresponding reference bit of the storage key memory is set, and whenever the buffer storage is referred, the corresponding reference bit of the reference bit memory is set. The reference bit of the storage key memory and the reference bit of the reference bit memory are ORed to produce a true reference bit.

7 Claims, 2 Drawing Figures

DATA PROCESSING SYSTEM PROVIDING DUAL STORAGE OF REFERENCE BITS

BACKGROUND OF THE INVENTION

The present invention relates to a data processing system, and more particularly to an improvement in a paging operation of a memory data processing system which operates in a virtual storage system and has a buffer storage.

The data processing system or an electronic computer which operates in a virtual storage mode carries out processing operations while moving instructions and data necessary to execute a program from a virtual storage (the substance of which is present in an external storage) to a real storage. The movement of such data is called "paging". A limited capacity of real storage is thus effectively utilized by the paging in which 2k bytes or 4k bytes of data are usually moved at a time. In the paging operation, in order to efficiently replace data stored particular real storage areas, a storage key is usually provided for every 2k bytes of a main storage. FIG. 1 shows an example of a format of the storage key. Access bits (ACC) 0–3 and a fetch protect bit (F) are used for storage protection, which bits are compared with a key contained in a processor when the memory is to be accessed. The ACC and F bits have no direct connection with the paging. A reference bit (R) and a change bit (C) bear information for the data replacement for the paging operation. The R bit is set to "1" whenever the corresponding memory area is accessed while the C bit is set to "1" whenever a write request is issued to the corresponding memory area. The storage key is disclosed in "IBM System/370 Principles of Operation", page 33. An operating system determines an appropriate real storage area based on the R and C bits of the storage key and the number of pages to be moved when paging is required to carry out the data replacement. An algorithm is such that a real storage area which has both R and C bits set to "0", that is, to which no memory reference has been made is firstly selected, and a real storage area which has the C bit set to "0", that is, to which no write operation has occured since the paging-in is secondly selected. If the paging area is not determined by the first and second table lookups, a real storage area which has the C bit set to "1" is selected. The paging by the third table lookup needs a paging-out operation in which data altered in the real storage is moved out to the external storage prior to the data transfer (called paging-in) from the external storage to the real storage.

The algorithm for determining the real storage area in the paging operation thus can allocate the real storage area efficiently when the history of the memory requests (fetches and stores) to the R and C bits of the storage key in the real storage is exactly reflected.

In an electronic computer having a buffer storage, the requested data can be furnished from the buffer storage to a central processor without referring to the real storage once the data has been transferred from the real storage to the buffer storage. Accordingly, the storage key associated with the real storage is not referred to and hence and status of the memory reference is not exactly reflected to the R bit. For example, assume that a fetch request has been issued to a memory area A and the request data was not stored in the buffer storage and reference has been made to the real storage to fetch a block including that data to the buffer storage, so that the R bit for that block has been set to "1". If a clear R bit instruction (RRB instruction) is thereafter issued to the memory area A, the corresponding R bit is set to "0". On the other hand, since the data block in the memory area A has been fetched to the buffer storage, when the fetch request to the memory area is subsequently issued, the corresponding data is read out of the buffer storage and the real storage is not referred to. As a result, the corresponding R bit associated with the real storage remains "0" in spite of the fact that the memory has been referred to, and the status of the memory reference is not correctly reflected by the R bit.

As described above, in an electronic computer having a buffer storage, the R bit may not be updated in spite of the fact that data in a memory area has been fetched. If such a condition takes place, a data area currently in use becomes a subject of paging, and when that area is to be referred to again another paging operation is required. As a result, the overhead for paging increases. It may be possible to refer to the storage key when a memory fetch request is issued and a corresponding data block is to be read out of the buffer storage, but it is not advisable because the burden to the real storage control unit increases.

SUMMARY OF THE INVENTION

It is an object of the present invention to eliminate the difficulties encountered in the prior art system and provide a virtual storage control system which correctly reflects a history of memory references without increasing the burden to a real storage control unit and reduces the overhead for the paging operation.

According to a feature of the present invention, the R bits for the paging operation comprise an R bit associated with a real storage and an R bit associated with a buffer storage and a program for achieving an OR function of both R bits.

DESCRIPTION OF THE PREFERRED EMBODIMENT

Referring to the accompanying drawing, a preferred embodiment of the present invention will be explained in detail.

Figure 1:
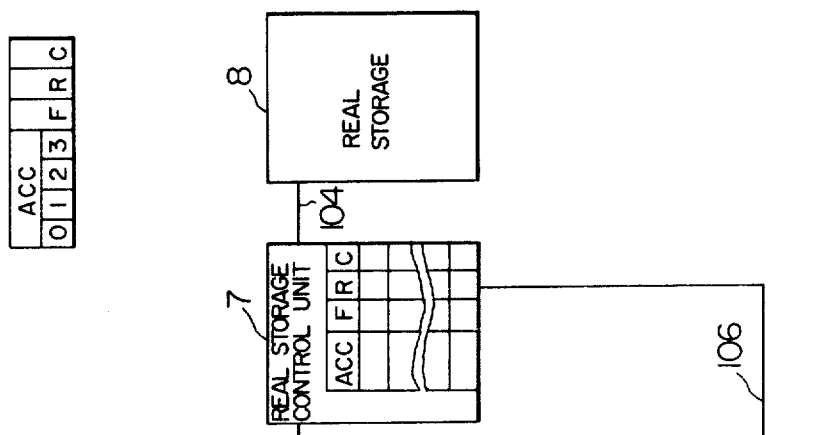
FIG. 1 is a diagram which shows a format of a storage key.
Figure 2:
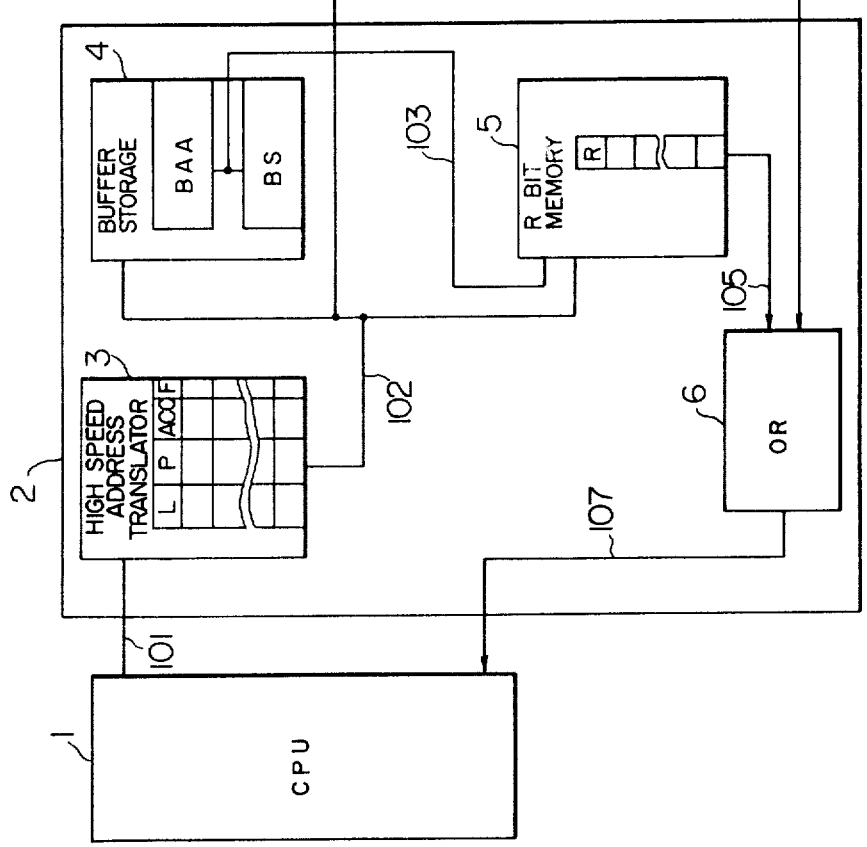
FIG. 2 is a block diagram of one embodiment of the present invention.

FIG. 2 shows a block diagram of one embodiment of the present invention. In FIG. 2, a central processor 1 is connected to a buffer storage control unit 2 through a virtual address transfer bus 101. The buffer storage control unit 2 comprises a high-speed address translator 3, a buffer storage 4, an R bit memory 5 and an OR gate 6. The high-speed address translator 3 includes an address buffer having a plurality of entries including a translation pair of a virtual address (L), a real address (P) and a partial copy (ACC, F) of a storage key, and it provides a result of the process (real address) to a real address transfer bus 102. The buffer storage 4 which receives the real address from the real address transfer bus 102 includes a buffer store (BS) for storing partial copies of data of the real storage 8 and a buffer address array (BAA) for storing addresses thereof. When an address which coincides with the memory request real address is registered in the BAA, the corresponding data is read out of the BS and a "1" bit is set to a control line 103 connected to the R bit memory 5, which retains reference bits one for each predetermined unit (e.g. 2k bytes or 4k bytes) of the real storage 8. The R bit memory 5 receives the real address from the real address transfer bus 102 and refers the corresponding R bit to the proper location in memory 5. The R bit data read out of the R bit memory 5 is supplied to the OR gate 6 through a bus 105. A real storage control unit 7 includes a storage key memory having a plurality of entries each including an access bit (ACC), a fetch protect bit (F), a reference bit (R) and a change bit (C). Each of the entries is provided for a predetermined unit of the real storage. Of the data read out, the R bit is supplied to the OR gate 6 through a line 106. The real storage 8 is connected to the real storage control unit 7 through the real address transfer bus 104. An output terminal of the OR gate 6 is connected to the central processor 1 through a line 107.

The requests issued by the central processor 1 are classified into two major categories, a memory reference and a storage key operation. The memory reference includes a case where a corresponding data block is not in the buffer store BS and a case where it is in the buffer store BS. The storage key operation includes a reset reference bit instruction (RRB) for resetting the R bit of the storage key of the corresponding data block, an insert storage key instruction (ISK) for loading the corresponding storage key into a general purpose register and a set storage key instruction (SSK) for newly setting the storage key of the corresponding data block. The operation of FIG. 2 is now explained with respect to those cases.

(i) Not in buffer store BS

When a memory request is issued by the central processor 1, a virtual address is applied via the bus 101 to activate the buffer storage control unit 2 and a corresponding real address is applied via the line 102 by the high-speed address translator 3. The ACC and F bits which are copies of the storage key read out simultaneously are used to check the storage protection. The real address on the line 102 is compared with the contents of the buffer address array (BAA) in the buffer storage 4 and non-coincidence is detected. The real address on the line 102 is then supplied to the real storage control unit 7 which updates the R and C bits of the storage key memory in accordance with the content of the memory request (fetch, store, etc.) and applies the real address via the line 104 to look up the real storage 8. While not shown in FIG. 2, the block data including the requested data read out of the real storage 8 is stored in the buffer store (BS) and the requested data is transferred to the central processor 1 to complete a series of processes. The above operation is the same as a conventional one.

(ii) In the buffer store BS

When a memory request is issued by the central processor 1, a real address is applied via the line 102 as is the case where the data is not in the buffer store BS, and the buffer storage 4 looks up the addresses in the buffer address array BAA. A coincidence is detected in the look-up operation of the BAA, and a corresponding block of the buffer store (BS) is referred to so that the requested data is transferred to the central processor 1. At the same time, a "1" bit is set to the line 103 by the detection of coincidence so that the R bit memory 5 is activated to set the R bit corresponding to the real address on the line 102.

(iii) RRB Instruction

When an RRB instruction is issued by the central processor 1, a real address is applied via the line 101 and the real address is provided to the line 102 without a looking up operation in the high-speed address translator 3. The content of the R bit memory 5 corresponding to the real address on the line 102 is reset and the real storage control unit 7 is activated so that the R bit of the corresponding storage key is reset.

(iv) ISK Instruction

When an ISK instruction is issued by the central processor 1, a real address is applied via the line 101 and the real address is provided to the line 102 as is the case of the RRB instruction. The R bit corresponding to the real address on the line 102 is read out of the R bit memory 5 and it is supplied to the OR gate 6 through the line 105, and the real storage 7 is activated so that the corresponding storage key is read out. While not shown in FIG. 2, the storage key excluding the R bit read out of the real storage control unit 7 is transferred directly to the central processor 1. The R bit of the storage key is ORed by the OR gate 6 through the line 106 with the data read out of the R bit storage 5 and the output of the OR gate 6 is transferred to the central processor 1 through the line 107.

(v) SSK Instruction

When an SSK instruction is issued by the central processor 1, a real address is applied via the line 101 and the high-speed address translator 3 looks up all of the high-speed address translation buffers to compare the content on the line 101 with the registered real addresses (P). Data prepared by the central processor 1 is written into the ACC and F bit positions of the entries to which coincidence has been detected. Thereafter, the real address is applied via the line 102 and the R bit memory 5 and the real storage control unit 7 are activated and the R bit prepared by the central processor 1 is written into the corresponding entry of the R bit memory 5 while all bits of the storage key are written into the corresponding entries of the key memory of the real storage control unit 7.

While a copy of the storage key for checking the storage protection is stored in the high-speed address translation buffer in the embodiment shown in FIG. 2, it may be stored in the R bit memory 5 so that all bits but the C bit of the storage key are stored therein. In this case, it is not necessary to look up all of the high-speed address translation buffers to search for the corresponding address when the SSK instruction is issued and hence the SSK instruction can be processed faster.

As described hereinabove, according to the present invention, the electronic computer having the buffer storage can correctly reflect the history of the memory references to the R bit of the storage key which plays an important role in the paging of the virtual storage system and can suppress the increase of the overhead in the paging operation.

What is claimed is:

1. A data processing system comprising:
real storage means including a plurality of storage units of predetermined length for storing data;
storage key memory means for retaining storage keys, each including a reference bit corresponding to a respective storage unit of said real storage means, and including means for setting the reference bit of the corresponding storage key therein whenever said real storage means is referred to;

buffer storage means for storing a partial copy of the data stored in said real storage means;

reference bit memory means for retaining reference bits, each corresponding to a respective storage unit of said real storage means, including means for setting the corresponding reference bit therein whenever said buffer storage means is referred to; and processing means for making reference to said real storage means and said buffer storage means and OR means operative when a real storage key instruction is issued by said processing means for ORing the reference bit of said storage key memory means with the corresponding reference bit of said reference bit memory means to produce a true reference bit.

2. A data processing system according to claim 1, further including a processing unit and means connected to said processing unit for resetting the reference bit of a designated storage key in said storage key memory means and the reference bit of said same designated storage key in reference bit memory means when a reset reference bit instruction designating said storage key is issued by said processing unit.

3. A data processing system according to claim 1, further including a processing unit and means responsive to said processing unit for setting the reference bit of a designated storage key in said storage key memory means and the reference bit of said same designated storage key in said reference bit memory means when a set storage key instruction designating said storage key is issued by said processing unit.

4. A data processing system according to claim 1, wherein said reference bit memory means includes means for storing all bits of the storage key except a change bit.

5. A data processing system comprising:

real storage means including a predetermined number of storage units for storing data;

storage key memory means for retaining storage keys each including a reference bit corresponding to a respective storage unit of said real storage means, including means for setting the reference bit of the corresponding storage key whenever said real storage means is referred to;

address translation means for retaining a translation pair of a virtual address and a real address and a partial copy of said storage key and for translating a virtual address into a real address;

a buffer storage including buffer store means for storing a partial copy of the data stored in said real storage means, buffer address array means for retaining real addresses of said real storage means corresponding to the data stored in said buffer store means, and means for referring to said buffer store means in accordance with the real address from said address translation means which is retained in said buffer address array means;

reference bit memory means for retaining reference bits, each corresponding to a respective storage unit of said real storage means, including means for setting the reference bit corresponding to the real address from said address translation means whenever said buffer store means in said buffer storage is referred to; and a processing unit, said buffer storage including means operative when a read storage key instruction is issued by said processing unit for translating a virtual address from said processing unit into a real address and for ORing the reference bits of said storage key memory means and said reference bit memory means indicated by said real address to produce a true reference bit.

6. A data processing system according to claim 5, further comprising means for resetting the reference bits in said storage key memory means and said reference bit memory means when a clear reference bit instruction is issued by said processing unit corresponding to a real address from said processing unit.

7. A data processing system according to claim 5, wherein said address translation means includes means responsive to a set storage key instruction from said processing unit for writing data from said processing unit in a storage key corresponding to a real address from said processing unit when said address translation means retains a real address equal to the real address from said processing unit, said reference bit memory means including means for writing the data from said processing unit as a reference bit corresponding to said real address, and said storage key memory means includes means for writing the data from said processing unit in a storage key corresponding to said real address.

* * * * *